(12) United States Patent
Bakewell

(10) Patent No.: US 7,796,869 B2
(45) Date of Patent: Sep. 14, 2010

(54) PHOTOBOOTH

(76) Inventor: Troy Bakewell, 3966 Minnehaha Ave., Minneapolis, MN (US) 55406

( * ) Notice: Subject to any disclaimer, the term of this patent is extended or adjusted under 35 U.S.C. 154(b) by 247 days.

(21) Appl. No.: 12/079,004

(22) Filed: Mar. 24, 2008

(65) Prior Publication Data
US 2008/0310829 A1 Dec. 18, 2008

Related U.S. Application Data

(60) Provisional application No. 60/919,824, filed on Mar. 23, 2007.

(51) Int. Cl.
*G03B 15/00* (2006.01)
(52) U.S. Cl. .......................................................... 396/2
(58) Field of Classification Search ............... 396/1–5; 135/87, 120.3, 139, 141, 156, 157
See application file for complete search history.

(56) References Cited

U.S. PATENT DOCUMENTS

| 626,753 | A | | 6/1899 | Ernest |
|---|---|---|---|---|
| 1,576,674 | A | | 3/1926 | Olsen |
| 2,188,747 | A | | 1/1940 | Bittick |
| D148,740 | S | | 2/1948 | Allen |
| 2,519,430 | A | | 8/1950 | Brown |
| 4,089,017 | A | | 5/1978 | Buldini |
| 4,114,665 | A | * | 9/1978 | Decker ................... 144/286.1 |
| 4,373,570 | A | | 2/1983 | Nussdorf et al. |
| 4,804,983 | A | | 2/1989 | Thayer, Jr. |
| 4,823,972 | A | * | 4/1989 | Ressler et al. ............. 220/4.28 |
| 4,926,893 | A | | 5/1990 | Klopfenstein et al. |
| 5,211,288 | A | | 5/1993 | Beall |
| 5,262,815 | A | | 11/1993 | Aumiller |
| 5,383,099 | A | * | 1/1995 | Peters .......................... 362/18 |
| 5,414,950 | A | | 5/1995 | Johnson, Sr. |
| 5,446,515 | A | | 8/1995 | Wolfe et al. |
| 5,478,129 | A | | 12/1995 | Goto et al. |
| 5,653,063 | A | | 8/1997 | Barnett et al. |
| 5,778,258 | A | * | 7/1998 | Zamoyski ....................... 396/2 |
| 5,784,651 | A | | 7/1998 | Mauchan |
| 6,085,195 | A | | 7/2000 | Hoyt et al. |
| 6,298,197 | B1 | | 10/2001 | Wain et al. |
| 6,457,683 | B1 | | 10/2002 | Armstrong, Sr. |
| 2001/0011262 | A1 | | 8/2001 | Hoyt et al. |
| 2003/0001846 | A1 | * | 1/2003 | Davis et al. ................. 345/474 |
| 2005/0179778 | A1 | * | 8/2005 | Nakanishi et al. ........ 348/207.2 |
| 2006/0092284 | A1 | | 5/2006 | Goodman et al. |
| 2006/0238005 | A1 | | 10/2006 | Walter et al. |

* cited by examiner

*Primary Examiner*—W. B. Perkey
*Assistant Examiner*—Minh Q Phan
(74) *Attorney, Agent, or Firm*—Kinney & Lange, P.A.

(57) ABSTRACT

A portable photobooth system includes a frame, fabric, a movable curtain, and a digital camera. The frame includes a plurality of tubular members configured to be connected together and capable of disassembly for storage and transport. The plurality of tubular members of the frame includes a substantially vertically-extending first bar and a U-shaped fitting attached to the first bar. The fabric covers at least portions of the frame to define a rectangular box-like enclosure having a doorway. The movable curtain is configured for covering the doorway. The digital camera is supported by the U-shaped fitting.

6 Claims, 9 Drawing Sheets

PHOTOBOOTH

CROSS-REFERENCE TO RELATED APPLICATION(S)

This application claims priority to U.S. Provisional Pat. App. No. 60/919,824 filed Mar. 23, 2007, which is hereby incorporated by reference in its entirety.

BACKGROUND

The present invention relates to a portable photobooth that can be used at special events such as a wedding reception or party.

Recently, photobooths have become popular at weddings. Guests are invited to enter an automated portrait studio. After producing a series of self portraits, the images are immediately printed, and the guests can leave with an original keepsake to remember the wedding day.

The photobooths that have been used at weddings have typically been vending machine type booths that are very costly to transport and set up. For instance, vending machine type booths typically are made of heavy and bulky materials, such as wood or composite panels connected in a fixed configuration. Typically, these vending machine type booths are unattractive and inconsistent in appearance with the location where the event is taking place.

Another drawback of vending machine type photobooths is that they typically do not produce high quality images. In addition, these photobooths typically do not archive their images. As a result, the bridal couple or event sponsor, who has paid for the photobooth, often does not get a chance to enjoy the resulting pictures because the guests take the photos home with them.

Vending machine type photobooths also tend to be relatively small. Only a limited number of people can fit within the photobooth at the same time.

SUMMARY

A portable photobooth system includes a frame, fabric, a movable curtain, and a digital camera. The frame includes a plurality of tubular members configured to be connected together and capable of disassembly for storage and transport. The plurality of tubular members of the frame includes a substantially vertically-extending first bar and a U-shaped fitting attached to the first bar. The fabric covers at least portions of the frame to define a rectangular box-like enclosure having a doorway. The movable curtain is configured for covering the doorway. The digital camera is supported by the U-shaped fitting.

In another aspect of the present invention, a photography method includes assembling a photobooth enclosure, installing a digital camera within the photobooth enclosure, capturing at least one self-portrait of a user within the photobooth enclosure using the digital camera, saving the at least one self-portrait as one or more electronic photo images, printing a selected one of the one or more electronic photo images at or near a location where the photobooth enclosure is assembled, and providing access to the one or more electronic photo images for later retrieval. The step of assembling a photobooth enclosure includes assembling a frame of the photobooth enclosure by connecting tubular members together and placing a fabric covering on the frame.

DETAILED DESCRIPTION

In general, a portable, modular photobooth system includes a frame of connectable tubular members and a fabric cover that is draped over the frame to produce an enclosed portrait studio. The frame is made up of a set of lightweight frame components can be transported to the site of a wedding or other event in a portable container and quickly assembled. The frame defines the top, side (or sidewalls), and door opening of the photobooth enclosure. Horizontal supports extending between vertical supports at a location spaced from the ground are provided to increase rigidity of the frame. The frame includes supports for mounting a digital camera, a computer, and lighting. The fully assembled photobooth system provides means for a person of group of persons to take self portraits in the photobooth, and for any resultant photos to be both electronically stored for later retrieval and made available on-site as instant photo printouts for guests to take with them from the event. The photobooth system allows the use of professional studio lighting equipment and quality digital cameras in order to provide true portrait studio results. The photobooth system is suitable for use at weddings, formal parties, and other events, with a generally attractive appearance that is consistent with the location where an event is taking place. The photobooth system produces high quality photo images that can be printed for guest to take copies with them, while also allowing archiving of images for alter retrieval, for instance, via a web site or burning to writable media like a CD-R.

Figure 1:
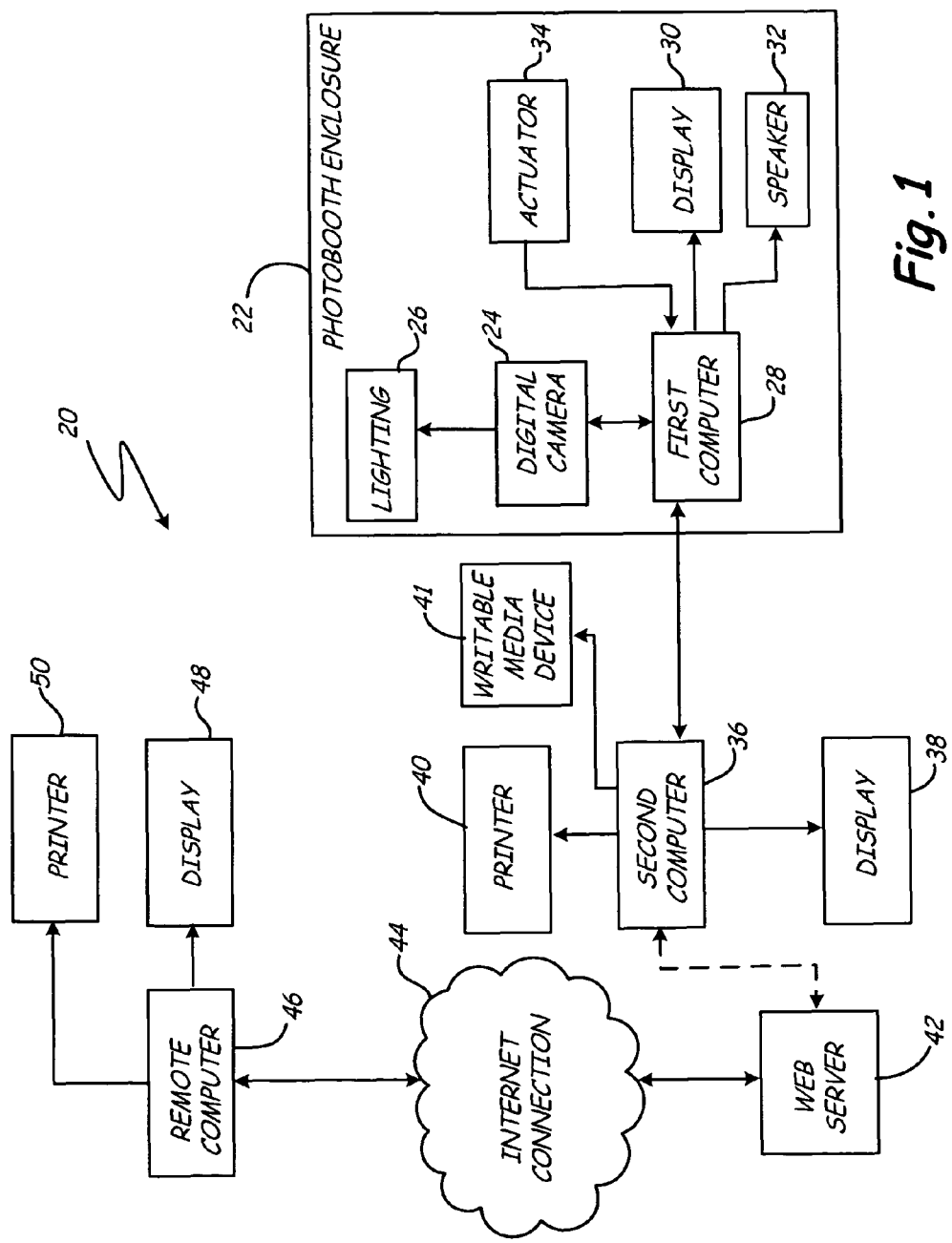
FIG. 1 is a block diagram of a photobooth system according to the present invention.

FIG. 1 is a block diagram of a photobooth system 20 that includes a photobooth enclosure 22. The photobooth enclosure 22 provides an at least partially enclosed space in which a photography subsystem including a digital camera 24, lighting 26, a first computer 28, a display (or monitor) 30, a speaker 32, and an actuator 34 can be positioned. Additionally, the photobooth system 20 can include other components located outside the photobooth enclosure 22, including a second computer 36 with a display (or monitor) 38, a printer 40 and a writable media device 41, a web server 42, an Internet connection 44, a remote computer 46 with a display (or monitor) 48 and a printer 50. The photobooth system 20, particularly the photobooth enclosure 22 and the photography subsystem components positioned therein, is designed to be quickly assembled and disassembled. Assembly can be performed by one person, with a limited number of tools.

The digital camera 24 can be any commercially available digital camera mounted within the photobooth enclosure 22 to allow photographic images to be captured. In particular, the photobooth system 20 can feature at least two embodiments: a standard resolution configuration and a high resolution configuration. Users can select the particular embodiment desired for particular events. In the standard resolution configuration, the digital camera 24 can have at least a 3 megapixel resolution that produces quality photo enlargements up to 5×7" prints (and 8×10" prints with good resolution). In the high resolution configuration, the digital camera 24 can be a professional 8 megapixel or greater DSLR camera that gives professional level photo images.

The lighting 26 can be any suitable photographic lighting assembly, such as professional quality studio lighting equipment, and is operably connected to the digital camera 24 (or alternatively to the first computer 28) to allow flash, strobe or other lighting effects produced by the lighting 26 to be synchronized as desired with the operation of the digital camera 24. The lighting 26 is typically positioned to illuminate photographic subjects located within the photobooth enclosure 22, and is configured or operated to provide a desired illumination intensity within the photobooth enclosure 22. A light meter (not shown) can be used in conjunction with the lighting 26 in further embodiments.

The first computer 28 can be a commercially available personal computer operably connected to the display 30, the speaker 32, the digital camera 24 and the actuator 34, and in a preferred embodiment is a laptop type computer where the display is integrated with the first computer 28. The first computer 28 includes convention components such a non-volatile memory, a processor, etc., and includes suitable software to communicate with connected components and to store digital images captured by the digital camera 24. The speaker 32 can be an external component operably connected to the first computer 28 (e.g., via a conventional universal serial bus (USB) connection). The first computer 28 can be installed in the photobooth enclosure 22 in such a way that the computer is secured to prevent theft, and can provide only limited access to computer functionality. For example, in an embodiment where the first computer 28 is a laptop computer, the laptop can be placed in a holder sleeve that restricts access to a keyboard. The display 30 can provide suitable prompts and instructions to users as to operation of the photobooth system 20, in particular providing instructions on how to activate the digital camera 24 to capture an image, that is, to take a photograph. The first computer 28 can control operation of the digital camera 24. In an alternative embodiment, the first computer 28 can be located outside of the photobooth enclosure 22.

The actuator 34 can be a large button positioned to be readily accessible for users in the photobooth enclosure 22 who wish to take a self-portrait. In one embodiment, the actuator 34 is positioned adjacent to the display 30 and mounted with hook-and-loop material (e.g., Velcro® hook-and-loop fastener material). The actuator 34 is operably connected to the first computer 28 (e.g., via a conventional universal serial bus (USB) connection), and depressing or otherwise actuating the actuator 34 initiates the capture of a photograph with the digital camera 24. Indication that a photograph has or will be taken can be provided via the display 30 and/or the speaker 32, as desired. In an alternative embodiment, the actuator 34 can be provided as a touch-screen interface, which can be integrated with the display 30.

The second computer 36 is typically installed adjacent to and outside of the photobooth enclosure 22. As with the first computer 28, the second computer 36 can be commercially available a laptop type personal computer in which the display 48 is integral. The printer 40 is operably connected to the second computer 36, and allows instant printouts of photographic images at a selected resolution. In a preferred embodiment, the printer 40 is configured to provide color photo printouts. The second computer 36 provides access for users to review photographic images captured with the digital camera 24. Selected photographic images can then be instantly printed on-site using the connected printer 40. All photographic images, whether printed or not, can be stored or archived by the second computer 36 (or alternatively by the first computer 28). The second computer 36 (or alternatively by the first computer 28) is also operably connected to the writable media device 41 (e.g., a CD-R, CD-RW, DVD-R or other writable disc drive). At the conclusion of an event, the writable media device 41 can transfer stored photographic images to writable media (e.g., burn the images to a writable disc), which can be retained by the event organizer or others. It should be noted that the second computer 36 is optional, and can be omitted from the system 20 in alternative embodiments.

Photographic images stored or archived by the second computer 36 (or alternative on the first computer 28) can be transferred to the web server 42 by any suitable means (e.g., a network connection, removable storage media, etc.). It should be noted that the first and second computers 36 need not be connected to the web server 42 when the photobooth enclosure 22 and photography subsystem are assembled and used to capture photographic images. For instance, the first or second computer 28 or 36 can be set up at a new location for the purpose of transferring data, that is, stored or archived photographic images, to the web server 42. A web site accessible via the web server 42 is provided for allowing remote access to the stored or archived photographic images in galleries. The web site can provide password and login protection or other security features to limit access to galleries of stored or archived photographic images from the web server 42. Photographic images can be grouped into galleries by event, allowing the web site and web server 42 to provide access to photographic images captured at a number of different events, while limiting access to the photographic images for each event to authorized users. Typically, the users authorized to access photographic images from a particular event will be the participants and/or organizers of that event. Thus, even persons not able to print photographic images at the time they are taken within the photobooth enclosure 22 can still access those images at a later time. The provision of online photo galleries on the web site can be included as a part of a single pricing package for use of the photobooth system 20 paid for by event organizers, meaning that event attendees can view the online photo galleries free of charge after the event.

The remote computer 46 can access the web site and the web server 44 via the Internet connection 44. The remote computer is operable connected to the display 48 and the printer 50. It should be understood that remote computer 46 is merely exemplary, and any number of computers each have nearly any configuration can connect to the web site and the web server 42 via the Internet connection 44. An authorized user can access the web site and the web server 42 to download desired photographic images associated with a gallery for a particular event, and can subsequently store those photographic images on the remote computer 46 and/or print those photographic images with the printer 50.

Figure 2:
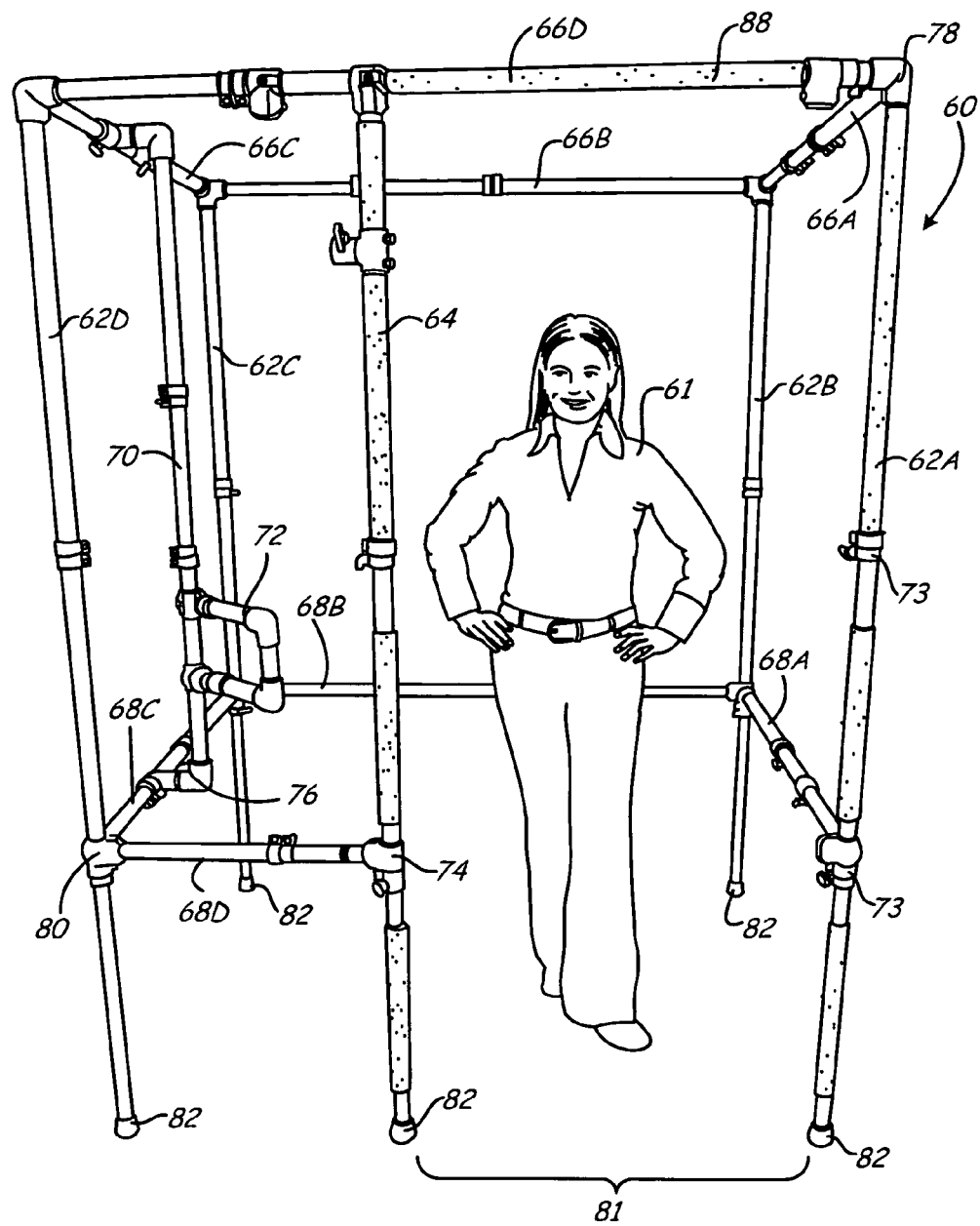
FIG. 2 is a perspective view of a first embodiment of a photobooth frame for the photobooth system.

The photobooth enclosure 22 can have numerous alternative sizes in alternative embodiments, allowing event organizer to select a suitable size for a particular event and event location. FIG. 2 is a perspective view of a first embodiment of a photobooth frame 60 of the photobooth enclosure 22 in what is called the "Classic" size, which is similar in size to traditional vending machine type photobooths. The "Classic" size photobooth frame 60 is configured to best accommodate couples or small groups of up to three or four people. For illustrative purposes, a person 61 is shown within the photobooth frame 60.

The photobooth frame 60 comprises a number of tubular members connected together to provide structural support for the photobooth enclosure 22, which in the illustrated embodiment defines a substantially rectangular box-shaped interior space. The tubular members of the photobooth frame 60 can be cylindrically shaped, or can have other tubular shapes. The tubular members are made of a relatively lightweight and rigid material, such as aluminum or plastic. The tubular members of the photobooth frame 60 help make the photobooth system 20 much easier and much less expensive to transport and set up than traditional vending machine type photobooths.

The tubular members of the photobooth frame 60 include four vertically-positioned corner posts 62A-62D, a vertically-positioned doorway post 64, four horizontally-positioned top bars 66A-66D, four horizontal links 68A-68D, and a camera, lights, monitor (CLM) bar 70. A generally U-shaped "U-fitting" 72 is also assembled from tubular members and attached to the CLM bar 70, with the open end of the U-shape arranged horizontally and facing the CLM bar 70. The tubular members can each be telescoping in length, to allow for compaction for storage and transport. For instance, in the illustrated embodiment, each corner post 62A-62D can telescope in three sections, which can be secured to maintain a desired length with hand-tightenable clamps 73 (only two clamps 73 are labeled in FIG. 2 for simplicity). The telescoping tubular members can be collapsed for storage and transportation, and expanded to suitable lengths for assembly with the photobooth frame 60. Markings can be provided on each of the telescoping tubular members for easy visual identification of suitable lengths for use with the photobooth frame 60.

Couplings, including T-fittings 74, elbows 76, top corner fittings 78 and lower corner fittings 80, are provided to connect tubular members together to define the photobooth frame 60. It should be noted that in FIG. 2 only a selected number of the couplings 74, 76, 78 and 80 are labeled in FIG. 2, for simplicity. The T-fittings 74 connect an end of one tubular member to a middle portion of an adjacent tubular member in a perpendicular, T-shaped orientation. The elbows 76 connect ends of two adjacent tubular members together at a right angle. The top corner fittings 78 connect ends of three adjacent tubular members together at right angles to each other. The lower corner fittings 80 connect ends of each of two tubular members to a middle portion of an adjacent tubular member perpendicular to one another. The T-fittings 74, the elbows 76, the top corner fittings 78 and the lower corner fittings 80 can accept ends of tubular members each secured with a set screw (e.g., having a head that can be tightened and released with an Allen wrench or hex-head socket wrench). The couplings 74, 76, 78 and 80 can be made of lightweight materials, such as plastic, with metal fasteners attached thereto.

In the illustrated embodiment, the corner posts 62A-62D are arranged parallel to each other to define vertical edges of a rectangular perimeter of the photobooth frame 60. The top bar 66A is connected between the corner posts 62A and 62B at a top of the photobooth frame 66, the top bar 66B is connected between the corner posts 62B and 62C at the top of the photobooth frame 66, the top bar 66C is connected between the corner posts 62C and 62D at the top of the photobooth frame 66, and the top bar 66D is connected between the corner posts 62D and 62A at the top of the photobooth frame 66. The doorway post 64 is positioned between the corner posts 62A and 62D and connects to the top bar 66D in order to define a doorway 81 between the doorway post 64, the corner post 62A and a portion of the top bar 66D. The horizontal link 68A is connected between the corner posts 62A and 62B at an intermediate height location in between the top and bottom of the photobooth frame 66, the horizontal link 68B is connected between the corner posts 62B and 62C at the intermediate height location, the horizontal link 68C is connected between the corner posts 62C and 62D at the intermediate height location, and the horizontal link 68D is connected between the corner posts 62D and 62A at the intermediate height location. The intermediate height location is spaced from both the top of the photobooth frame 60 and the underlying ground or floor surface on which the photobooth frame 60 rests, in order to provide structural support and increase the rigidity and stiffness of the assembled photobooth frame 60. The CLM bar 70 is connected between the top bar 66C and the horizontal link 68C, in a location that is spaced from the doorway 81 of the photobooth frame 60. The CLM bar 70 includes a main portion that is parallel to the corner posts 62A-62D and offset slightly from the top bar 66C and the horizontal link 68C toward the interior of the photobooth frame 60. The CLM bar 70 provides a mounting location for the photography subsystem (not shown in FIG. 2) within the photobooth enclosure 22. The U-fitting 72 is connected to the CLM bar 70 at a suitable height, and positioned to extend into the interior of the enclosure of the photobooth frame 60.

Additionally, stoppers 82 are provided at bottom ends of each of the corner posts 62A-62D and the doorway post 64. The stoppers 82 can be feet or caps made of rubber or another compliant material, in order to protect floor surfaces on which the photobooth frame 60 is installed.

Figure 3:
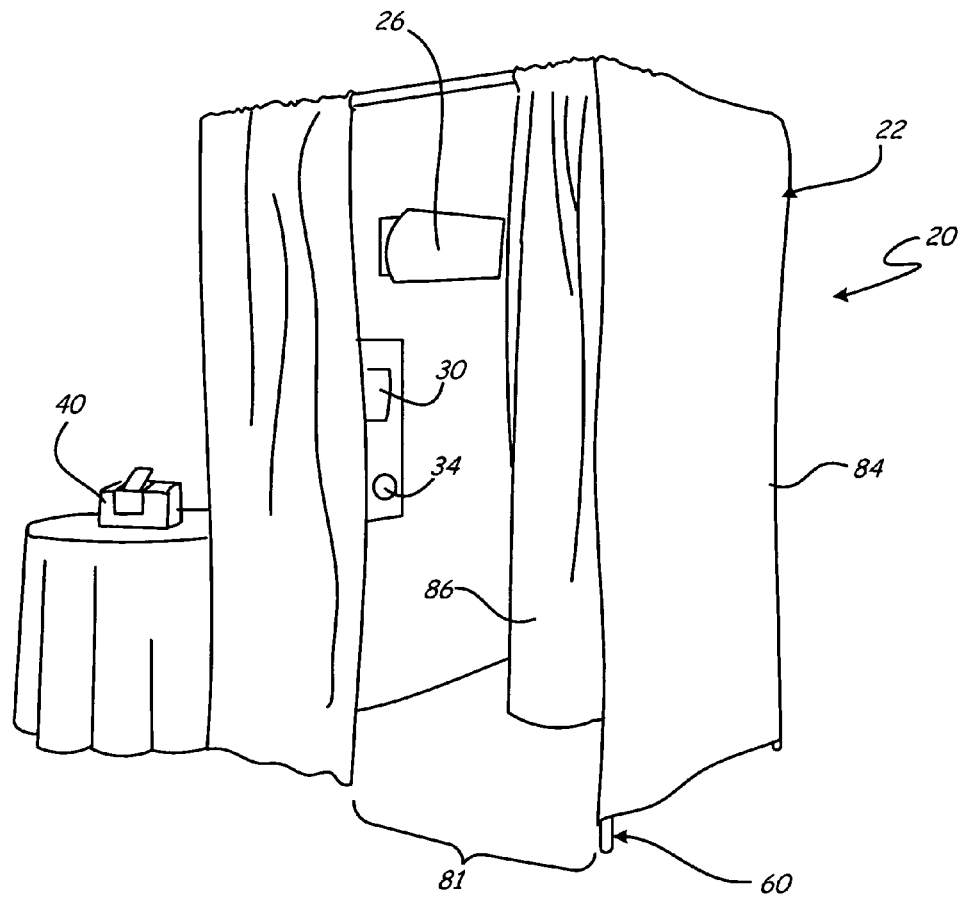
FIG. 3 is a perspective view of the photobooth system utilizing the first embodiment of the photobooth frame.

FIG. 3 is a perspective view of the photobooth system 20 utilizing the first embodiment of the photobooth frame 60, with a fabric covering 84 installed over the frame 60. As shown in FIG. 3, the fabric covering 84 covers substantially all of the photobooth frame 60, including complete coverage of a top and four sides of the frame 60, but excluding the doorway 81 and the bottom along the floor or ground surface on which the frame 60 rests. Chairs or other seating (not shown) for users can be provided within the photobooth enclosure 22. A movable curtain 86 is positioned to cover at least a portion of the doorway 81. A suitable backdrop (not shown) can additionally be provided within the photobooth enclosure 22. The fabric covering 84 and the curtain 86 provide a generally opaque barrier in between tubular members of the photobooth frame 60, to enclose the interior space of the frame 60 in order to provide a suitable barrier to light and a suitable backdrop for photos captured inside. In one embodiment, the fabric covering 84 is a black cloth material and the curtain 86 is a red cloth material. The fabric covering 84 can be draped or wrapped around the tubular members of the photobooth frame 60. The curtain 86 can be secured to the photobooth frame 60 at the doorway 81 with hook-and-loop material 88 (e.g., Velcro® hook-and-loop fastener material), shown in FIG. 2 but not visible in FIG. 3. The fabric covering 84 and the curtain 86 provide an attractive appearance to the photobooth enclosure 22, in contrast to the unattractive appearance of most rented vending machine type booths. Thus, the photobooth enclosure 22 of the present invention can add to the beauty and ambiance of a room where installed, rather than detracting from it. The fabric covering 84 and the curtain 86 can be easily cleaned, which helps the photobooth system 20 maintain a cleaner appearance over time than traditional vending machine style photobooths, which tend to accumulate unsightly dust and dirt.

Figure 4:
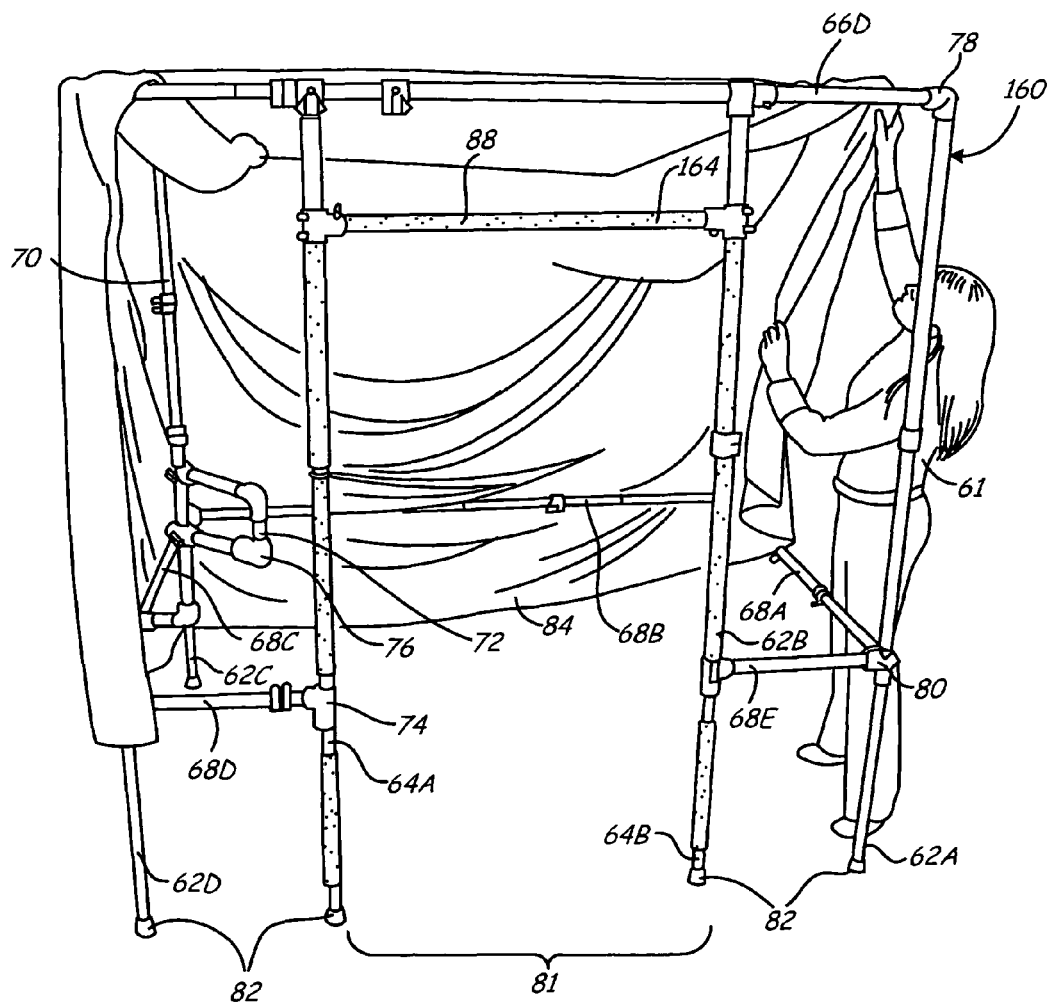
FIG. 4 is a perspective view of a second embodiment of a photobooth frame of the photobooth system with a fabric covering partially installed.

FIG. 4 is a perspective view of a second embodiment of a photobooth frame 160 of the photobooth system 20 with a fabric covering 84 partially installed. The photobooth frame 160 in the illustrated embodiment is what is called the "Contemporary" size, which is larger in size than traditional vending machine type photobooths. The "Contemporary" size photobooth frame 160 is particularly well suited for weddings, and can handle larger groups of four or more persons yet still produce nicely composed portraits for couples. For illustrative purposes, a person 61 is shown adjacent to the photobooth frame 160 installing the fabric covering 84.

The photobooth frame 160 can be constructed from tubular members similar to those described above with respect to the first embodiment of the frame 60, including four vertically-positioned corner posts 62A-62D, four horizontally-positioned top bars 66A-66D, four horizontal links 68A-68D, a CLM bar 70, a U-fitting 72 assembled from tubular members. Also, couplings, including T-fittings 74, elbows 76, top corner fittings 78 and lower corner fittings 80, are provided to connect tubular members together to define the photobooth frame 160. The photobooth frame 160 can be assembled from the same tubular members that can be assembled to form the first embodiment frame 60, assembled in a different manner to form the second embodiment frame 160. In order to assemble the tubular members in a different configuration, the tubular members can be telescoped to different lengths to match the desired configuration. The photobooth frame 160 differs from the photobooth frame 60 in that the large second embodiment frame 160 includes two vertically-positioned doorway posts 64A and 64B and a horizontally-extending doorway header 164 connected between the doorway posts 64A and 64B. Additionally, a fifth horizontal link 68E is connected between the second doorway post 64B and the corner post 62A. As shown in FIG. 4, a doorway 81 is defined between the doorway posts 64A and 64B and the doorway header 164, and is positioned approximately halfway between the corner posts 62A and 62D.

Figure 5:
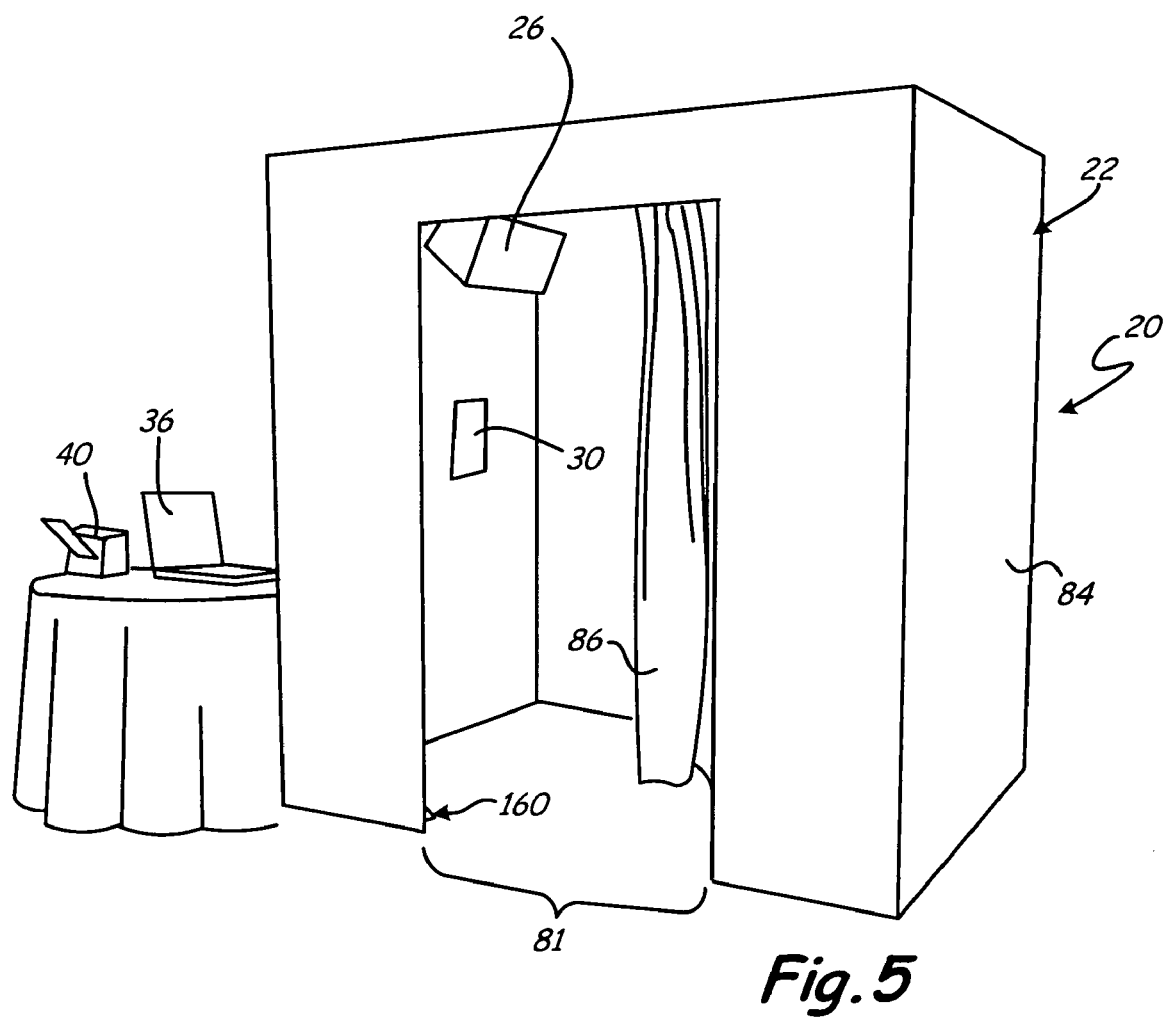
FIG. 5 is a perspective view of the photobooth system utilizing the second embodiment of the photobooth frame.

FIG. 5 is a perspective view of the photobooth system 20 utilizing the second embodiment of the photobooth frame 160. As with the first embodiment, the fabric covering 84 covers substantially all of the second embodiment photobooth frame 160, including complete coverage of a top and four sides of the frame 160, but excluding the doorway 81 and the bottom along the floor or ground surface on which the frame 160 rests. Chairs or other seating (not shown) can be provided within the photobooth enclosure 22. A movable curtain 86 is positioned to cover at least a portion of the doorway 81. The fabric covering 84 can be a black cloth material and the curtain 86 can be a red cloth material. The fabric covering 84 can be draped or wrapped around the tubular members of the photobooth frame 160. The curtain 86 can be secured to the photobooth frame 160 at the doorway 81 with hook-and-loop material 88 (e.g., Velcro® hook-and-loop fastener material), shown in FIG. 4 but not visible in FIG. 5.

Figure 6:
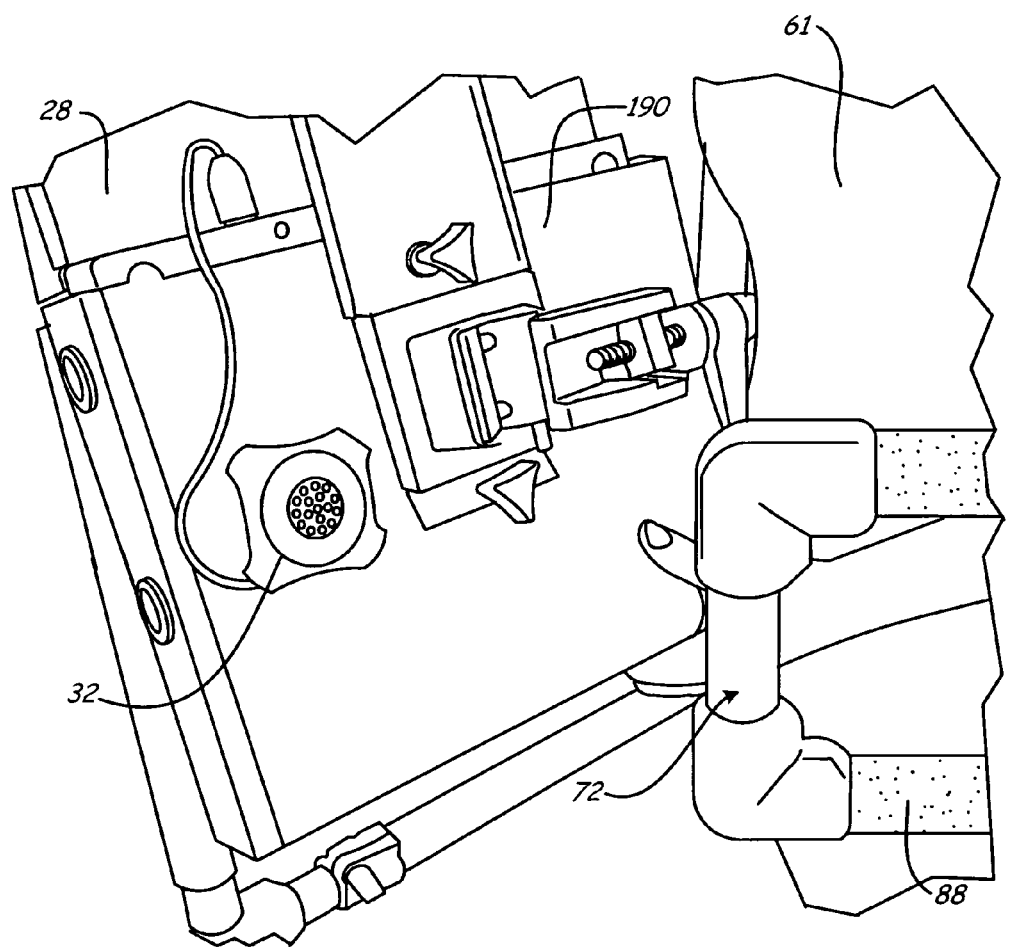
FIG. 6 is a perspective view of a portion of a photography subsystem of the photobooth system being installed to a U-fitting of a photobooth frame.

FIG. 6 is a perspective view of a portion of a photography subsystem of the photobooth system being installed to the U-fitting 72 of a photobooth enclosure 22 (having any embodiment of a photobooth frame). More particularly, FIG. 6 shows a first computer 28 in a mounting sleeve 190 with an attached speaker 32 being installed to a vertical portion of the U-fitting 72 by a person 61. In the illustrated embodiment, hook-and-loop material 88 is provided on a horizontal portion of the U-fitting 72.

Figure 7:
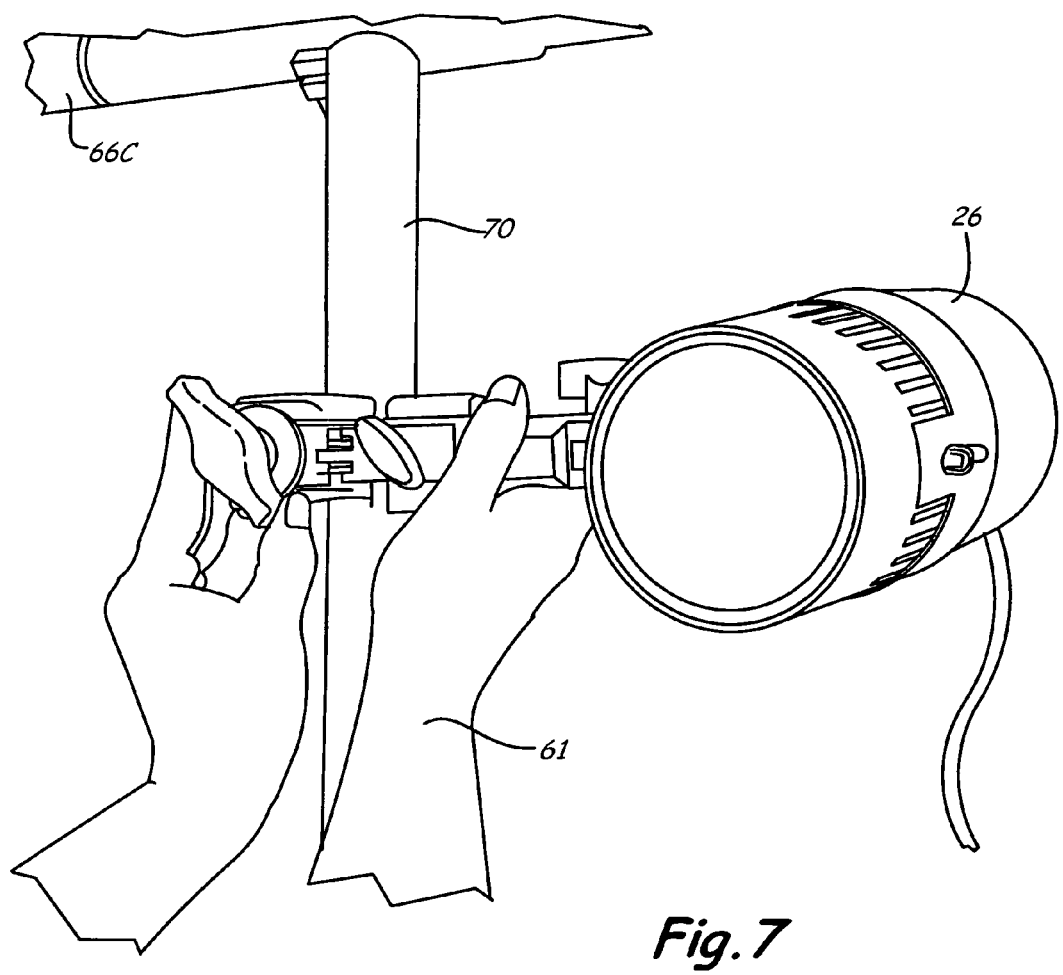
FIG. 7 is a perspective view of lighting being installed to a photobooth frame.

FIG. 7 is a perspective view of lighting 26 being secured to a CLM bar 70 of a photobooth enclosure 22 (having any embodiment of a photobooth frame). In the illustrated embodiment, the lighting 26 is a professional quality light unit with a hand-tightenable clamp.

Figure 8:
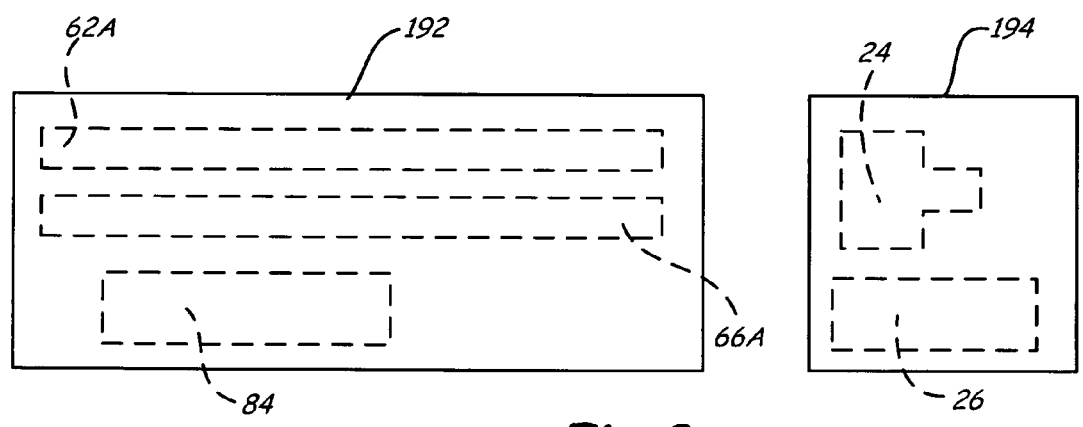
FIG. 8 is a top plan view of a pair of cases each holding components of the photobooth system.

The photobooth system 20 can be disassembled for storage and transport. FIG. 8 is a top plan view of a pair of cases 192 and 194 each holding components of the photobooth system 20. In the illustrated embodiment, the case 192 is a hard-sided case comparable in size to a golf club case, with exemplary tubular members 62A and 66A and fabric covering 84 shown located inside the case 192. The case 194 is a soft-sided, padded case, with exemplary photographic subsystem components including a digital camera 24 and lighting 26 shown inside the case 194, in the illustrated embodiment. The cases 192 and 194 allow transport of the photobooth system 20 in a compact fashion, with the tubular members of the photobooth frame telescoped to their shortest possible lengths and fragile equipment packed separately with suitable padding.

Figure 9:
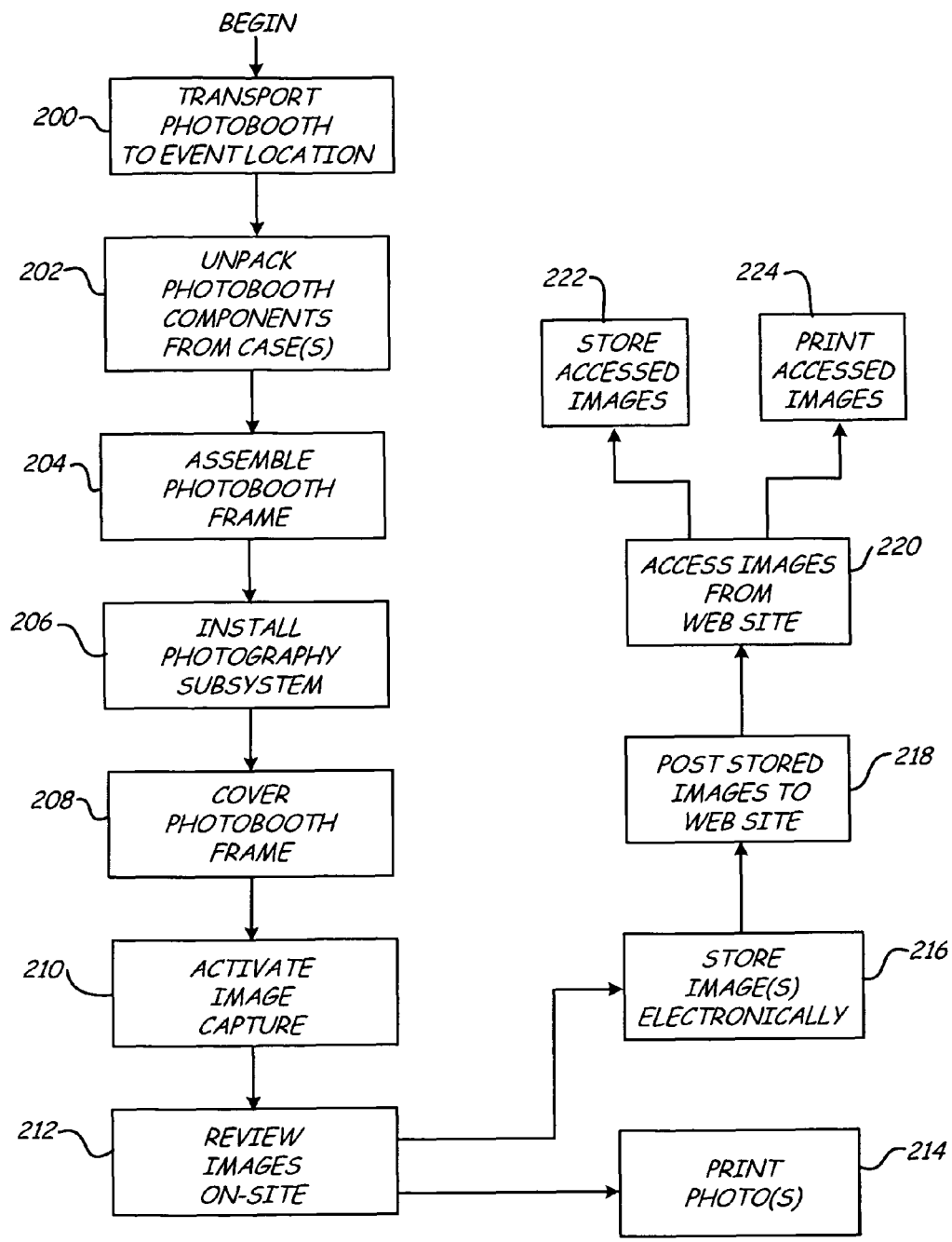
FIG. 9 is a flow chart illustrating a method for assembling and operating the photobooth system.

FIG. 9 is a flow chart illustrating a method for assembling and operating the photobooth system 20. First, the photobooth system 20 is transported to an event location (step 200). Next, photobooth system components are unpacked from any case or cases in which they were stored for transportation and storage (step 202). Once unpacked, the photobooth frame 60 or 160 of the photobooth enclosure 22 can be assembled at the event location (step 204). The photography subsystem can then be installed (step 206), including, for example, installation of the digital camera 24, the lighting 26, computers 28 and 36, the displays 30 and 38, the speaker 32, the actuator 34, and the printer 40. Some components of the photography subsystem, such as the printer 40, are installed outside of the photobooth enclosure 22, such as on a table located adjacent to the photobooth enclosure 22 and covered with a tablecloth consistent in appearance with the fabric covering 84 of the photobooth enclosure 22. The photobooth frame 60 or 160 can then be covered with the fabric covering 84, and the curtain 86 installed (step 208). It should be understood that the photography subsystem can be installed after or before the fabric covering 84 and the curtain 86 are placed on the photobooth frame 60 or 160, in alternative embodiments. As mentioned above, assembly can be performed by one person with a limited number of tools.

In operation, after the photobooth system 20 has been fully assembled, a user enters the photobooth enclosure 22 and actuates the actuator 34 to capture a photographic image with the digital camera 24, with the lighting providing illumination at or near the time the image is captured (step 210). Instruction for image capture can be prompted to users by the display 30 within the photobooth enclosure 22. Photographic images captured by the digital camera 24 are transferred via the first computer 28 to the second computer 36. Users can then review captured images on-site (step 212), for instance, users can view captured images on the display 30 operably connected to the second computer 36 and located outside the photobooth enclosure 22. Users can then instantly print selected captured images as photo prints using the printer 40 (step 214). Regardless of whether any photos were printed at step 214, all captured images are stored electronically (step 216). As discussed above, the stored photo images can be saved to a computer and/or a writable disc media.

After the event has concluded where the photobooth enclosure 22 was installed, stored photo images can be posted to image galleries on a web site hosted on the web server 42 (step 218). A user at a remote computer 46 can access images in selected image galleries of the web site over an Internet connection 44 (step 220). Access to the online galleries can be restricted by password, or using other security features, for instance, to limit access of certain users to photo galleries for particular events. Once accessed from an online gallery, selected images can then be stored (step 222) and printed (step 224) as desired, using the remote computer 46 and the operably connected display 48 and printer 50.

Although the present invention has been described with reference to preferred embodiments, workers skilled in the art will recognize that changes may be made in form and detail without departing from the spirit and scope of the invention. For instance, the particular positioning of a camera within a photobooth enclosure of the present invention can vary as desired for particular applications, as can the particular size, shape, and configuration of a photobooth frame defining the photobooth enclosure. Moreover, the layout and functionality of the online web galleries that make available photo images captures in the photobooth enclosure for viewing and/or printing at remote locations can vary as desired.

The invention claimed is:

1. A photography method comprising:
   assembling a photobooth enclosure, the step comprising:
   telescoping a plurality tubular members to extend lengths thereof;
   assembling a frame of the photobooth enclosure by connecting the tubular members together; and
   placing a fabric covering on the frame;
   installing a digital camera within the photobooth enclosure;
   capturing at least one self-portrait of a user within the photobooth enclosure using the digital camera;
   saving the at least one self-portrait as one or more electronic photo images;
   printing a selected one of the one or more electronic photo images at or near a location where the photobooth enclosure is assembled;
   providing access to the one or more electronic photo images for later retrieval;
   disassembling the photobooth enclosure, the step comprising:
   removing the fabric covering from the frame;
   disassembling the frame of the photobooth enclosure by disconnecting the tubular members; and
   telescoping the tubular members to reduce the lengths thereof for storage or transport; and
   securing the fabric covering and the tubular members of the frame at least partially within a carrier.

2. The method of claim 1 and further comprising:
   transporting components of the photobooth enclosure to an event location prior to assembling the photobooth enclosure.

3. The method of claim 1, wherein the step of providing access to the one or more electronic photo images for later retrieval comprises:
   providing an online gallery of saved electronic photo images.

4. The method of claim 3 and further comprising:
   providing a password to access one of the online photo galleries.

5. The method of claim 1 wherein the step of providing access to the one or more electronic photo images for later retrieval comprises:
   saving the one or more electronic photo images to a writable disc media.

6. The method of claim 1 and further comprising:
   installing a computer adjacent to and outside the photobooth enclosure and operably connected to the digital camera, for allowing users to review electronic photo images and selecting ones for printing.

* * * * *